US012554227B2

(12) United States Patent
Zaugg

(10) Patent No.: US 12,554,227 B2
(45) Date of Patent: Feb. 17, 2026

(54) SYMPATHIQUE WATCH COMPRISING A COUPLING DEVICE

(71) Applicant: Montres Breguet S.A., L'Abbaye (CH)

(72) Inventor: Alain Zaugg, Le Sentier (CH)

(73) Assignee: Montres Breguet S.A., L'Abbaye (CH)

( * ) Notice: Subject to any disclaimer, the term of this patent is extended or adjusted under 35 U.S.C. 154(b) by 654 days.

(21) Appl. No.: 17/961,047

(22) Filed: Oct. 6, 2022

(65) Prior Publication Data

US 2023/0205144 A1 Jun. 29, 2023

(30) Foreign Application Priority Data

Dec. 23, 2021 (EP) .................................... 21217362

(51) Int. Cl.

*G04D 1/06* (2006.01)
*G04B 3/00* (2006.01)
*G04B 13/00* (2006.01)
*G04B 18/02* (2006.01)
*G04B 27/00* (2006.01)
*G04B 27/02* (2006.01)

(Continued)

(52) U.S. Cl.

CPC ............... *G04D 1/06* (2013.01); *G04B 3/006* (2013.01); *G04B 18/021* (2013.01); *G04B 27/004* (2013.01); *G04B 27/007* (2013.01); *G04B 27/02* (2013.01); *G04C 11/007* (2013.01); *G04D 7/009* (2013.01); *G04D 7/1257* (2013.01)

(58) Field of Classification Search

CPC ........ G04D 1/06; G04D 7/009; G04D 7/1257; G04B 3/006; G04B 18/021; G04B 27/004; G04B 27/007; G04B 27/02; G04B 5/00; G04B 19/22; G04B 19/235; G04B 11/008; G04B 11/08; G04B 19/00; G04B 31/0123; G04B 21/12; G04B 17/285; G04B 19/02; G04C 11/007; G04F 7/0885; G04F 7/00

USPC .................................. 73/1.15; 368/206, 208

See application file for complete search history.

(56) References Cited

U.S. PATENT DOCUMENTS

2012/0020192 A1* 1/2012 Calabrese ............. G04F 7/0885 368/106

FOREIGN PATENT DOCUMENTS

EP 3 945 374 A1 2/2022

OTHER PUBLICATIONS

George Daniels, "Sympathique, Setting and Regulating the Watch", The Art of Breguet, Sotheby Parke Bernet London & New York 1975, pp. 1-11.

(Continued)

*Primary Examiner* — Brandi N Hopkins
(74) *Attorney, Agent, or Firm* — Sughrue Mion, PLLC

(57) ABSTRACT

A sympathique watch (10) including a horological movement including a going train (20), a display train (30) connected to at least one display of a time value, a sympathique hand-setting mechanism and a crown (13) operated hand-setting mechanism. The sympathique hand-setting mechanism includes a coupling device (40) interposed between the going (20) and display (30) trains, the coupling device (40) being configured to adopt an uncoupled state in which it disengages the going train (20) from the display train (30) so as to allow the hands to be set on the display by means of the sympathique hand-setting mechanism, and a coupled state in which it establishes a kinematic link between the gear trains, the link allowing for sliding enabling the hands to be set on the display by means of the crown (13) operated hand-setting mechanism.

12 Claims, 2 Drawing Sheets

(51) Int. Cl.
*G04C 11/00* (2006.01)
*G04D 7/00* (2006.01)
*G04D 7/12* (2006.01)

(56) References Cited

OTHER PUBLICATIONS

European Search Report of EP 21 21 7362 dated Jun. 2, 2022.

* cited by examiner

SYMPATHIQUE WATCH COMPRISING A COUPLING DEVICE

CROSS REFERENCE TO RELATED APPLICATIONS

This application claims priority to European Patent Application No. 21217362.9, filed on Dec. 23, 2021, the entire contents of which are incorporated herein by reference.

TECHNICAL FIELD OF THE INVENTION

The invention relates to the field of horology, and in particular that of sympathique watches.

More particularly, the invention relates to a sympathique watch comprising a coupling device.

TECHNOLOGICAL BACKGROUND

Clocks referred to as "sympathique clocks" exist and can wind, set the hands of and regulate watches, referred to as "sympathique watches", with which they are intended to cooperate, without any other constraint than placing the watch in a dedicated receptacle arranged on the clock.

These three functions, referred to as "sympathique functions", are carried out simultaneously at a time defined by the construction of the clock, usually once or twice a day.

Sympathique watches have a very complex horological movement insofar as it must include mechanisms designed to perform sympathique functions, and mechanisms designed to perform similar functions, but under the control of the user of the watch, not the clock.

The present invention aims to simplify the design, and thus the manufacture, of a horological movement of a sympathique watch.

SUMMARY OF THE INVENTION

To this end, the invention relates to a sympathique watch comprising a horological movement including a going train, a display train connected to at least one display of a time value, a sympathique hand-setting mechanism and a crown-operated hand-setting mechanism.

The sympathique hand-setting mechanism includes a coupling device interposed between the going and display trains, said coupling device being configured to adopt an uncoupled state in which it disengages the going train from the display train so as to allow the hands to be set on the display by means of the sympathique hand-setting mechanism, and to adopt a coupled state in which it establishes a kinematic link between said gear trains, said link allowing for sliding enabling the hands to be set on the display by means of the crown-operated hand-setting mechanism.

Thanks to the features of the invention, the watch thus does not include any indenting of the cannon-pinion or any friction drive wheel, which are necessary in watches of the prior art to set the hands on displays.

This results in a simplified design of the horological movement of the watch according to the invention.

It should be noted that, in the present text, reference is made to a crown-operated hand-setting mechanism to designate a hand-setting mechanism intended to be operated by a user. The term "crown" is thus intended to cover any actuator equivalent to a crown, such as push buttons or correctors well known to a person skilled in the art.

In specific embodiments, the invention can further include one or more of the following features, which must be considered singly or according to any combinations technically possible.

In specific embodiments, the going train includes a centre wheel set and the display train includes a cannon-pinion, the coupling device being configured such that when in the coupled state, it engages said centre wheel set and said cannon-pinion such that they rotate as one.

Advantageously, the centre wheel set and the cannon-pinion are arranged concentrically, which helps to simplify the assembly of the horological movement.

In specific embodiments, the centre wheel set comprises a centre pinion mounted such that it pivots about a centre shaft, the cannon-pinion being arranged about the centre shaft via a sliding pivot link.

In particular, the cannon-pinion can be fitted directly onto the centre shaft or can be fitted onto a tubular portion of the centre pinion within which the centre shaft is engaged.

In specific embodiments, the horological movement includes a collar intended to constitute an axial stop for the cannon-pinion.

In specific embodiments, the cannon-pinion is arranged such that, when the coupling device is in the uncoupled state, it has an axial motion and is capable of resting against the centre wheel set.

In specific embodiments, the coupling device includes a disc fixed to the cannon-pinion, a friction spring carried by the centre wheel set, and a flange interposed between the disc and the friction spring such that said friction spring applies to said flange a force that tends to force the flange into bearing, via a friction surface, against the disc.

In specific embodiments, the disc and the flange are configured such that, when the coupling device is in a coupled state, the friction torque generated at the interface between the friction surface of the flange and said disc is substantially 80 g·mm.

In specific embodiments, the coupling device includes a clamp comprising two arms capable of moving relative to one another and arranged on either side of the flange, said arms being adapted to cooperate with said flange so as to cause the coupling device to change state.

In specific embodiments, the flange includes an inner periphery opposite an outer periphery, one being configured to cooperate with the friction spring and the other configured to cooperate with the clamp.

In specific embodiments, the flange is configured such that it bears against a structure of the horological movement via a bearing surface opposite the friction surface, when the coupling device is in the uncoupled state.

BRIEF DESCRIPTION OF THE FIGURES

Other features and advantages of the invention will be better understood upon reading the following detailed description, which is given as a rough guide and in no way as a limiting guide, with reference to the accompanying drawings, in which.

DETAILED DESCRIPTION OF THE INVENTION

Figure 1:
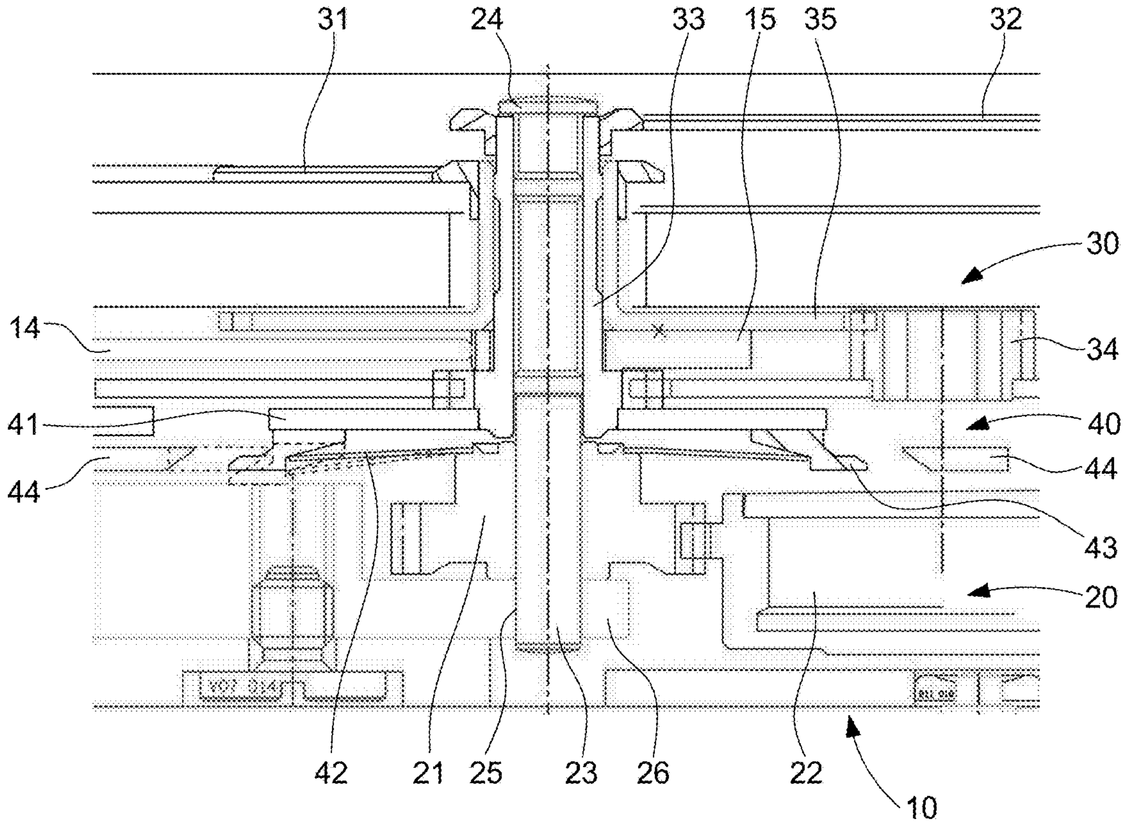
FIG. 1 diagrammatically shows a sectional view of a part of a horological movement of a sympathique watch according to one example embodiment of the present invention.
Figure 2:
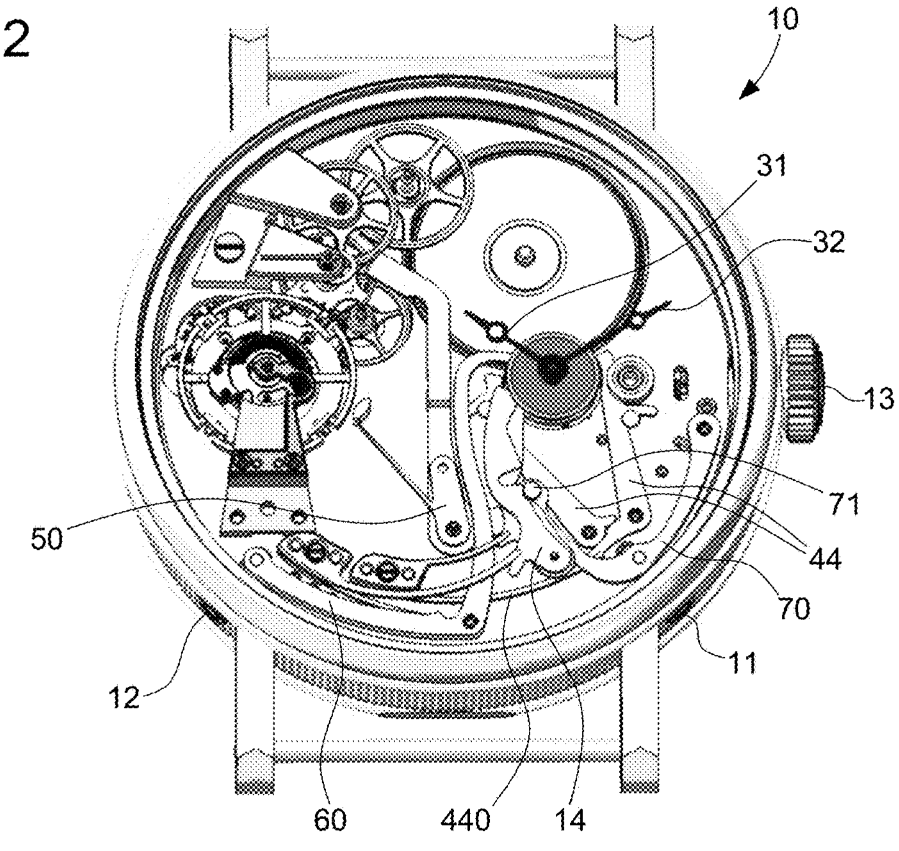
FIG. 2 shows a front view of the watch in FIG. 1.

The present invention relates to a sympathique watch 10 comprising a horological movement, part of which is shown in the sectional view in FIG. 1 and part of which is visible in the front view in FIG. 2.

The horological movement includes a going train 20 and a display train 30 connected to at least one display of a time value. FIGS. 1 and 2 show the at least one display of a time value in the form of an hours display 31 and a minutes display 32 in the form of hands.

The horological movement further comprises a sympathique hand-setting mechanism and a crown 13 operated hand-setting mechanism. It is evidently understood here that these hand-setting mechanisms are two separate mechanisms, one whereof is intended to be activated by a sympathique clock and the other whereof is intended to be activated by a user of the watch 10.

The sympathique hand-setting mechanism comprises a coupling device 40 interposed between the going train 20 and the display train 30. The coupling device 40 is configured to take an uncoupled state wherein it disengages the going train 20 from the display train 30, and a coupled state wherein it establishes a kinematic link between said gear trains, said kinematic link allowing sliding between said gear trains.

In other words, the coupling device 40 allows, when uncoupled, the hours display 31 and the minutes display 32 to rotate independently of the going train 20, and when coupled, allows the display train 30 to be driven, and thus said displays to be driven, by the going train 20, while still allowing said display train 30 to be driven independently of said going train 20, as described in detail hereinbelow.

Advantageously, when in the uncoupled state, the coupling device 40 allows the hours 31 and minutes 32 displays to be set by means of the sympathique hand-setting mechanism, and when in the coupled state, it ensures that the displays are driven by the going train and, thanks to the sliding, allows the hands to be set on said displays by means of the crown 13 operated hand-setting mechanism.

The sympathique hand-setting mechanism and the crown 13 operated hand-setting mechanism are known in the prior art and are within the reach of a person skilled in the art as such. The horological movement can comprise a sympathique hand-setting mechanism and a crown 13 operated hand-setting mechanism of any design known in the prior art or within the reach of a person skilled in the art, and is not exclusive to mechanisms of a specific design. These sympathique hand-setting mechanism and crown 13 operated hand-setting mechanism are thus not described in detail hereinbelow, but are described only briefly in specific example embodiments.

The sympathique hand-setting mechanism can include a mechanism for resetting the hours 31 and minutes 32 displays, a mechanism 50 for stopping a resonator of the watch 10 and hand-setting means 60.

The coupling device 40, the reset mechanism and the stop mechanism 50 can be connected to a first sympathique actuator 11 of the watch 10 intended to cooperate with a first sympathique actuator of the clock, so as to receive, from said first sympathique actuator of the clock, loads and transmit them to the coupling device 40 and to the reset mechanism and stop mechanism 50.

The hand-setting means 60 can be connected to a second sympathique actuator 12 of the watch 10 intended to cooperate with a second sympathique actuator of the clock, so as to receive, from said first sympathique actuator of the clock, loads and transmit them to the hand-setting means 60. On receiving these loads, the hand-setting means 60 are configured to act on the display train 30 in order to drive the hours 31 and minutes 32 displays such that they rotate.

The crown 13 operated hand-setting mechanism (not shown in the figures) includes a setting stem connected to the crown 13, a sliding pinion arranged on said setting stem, and a pull-out piece integral with said setting stem and disposed so as to drive the sliding pinion such that it slides via a lever. When the crown 13 is arranged in a hand-setting position, the sliding pinion meshes with an intermediate wheel kinematically connected to the display train 30, preferably via the motion-work.

As shown in FIG. 1, the going train 20 includes a centre wheel set, in the form of a centre pinion 21 connected, in a manner known per se, to a power source, such as a barrel 22.

The display train 30 includes a cannon-pinion 33 to which a motion-work 34 is connected and around which an hours wheel 35 is arranged such that it can rotate, said hours wheel being meshed with the motion-work 34.

In a manner known per se, the cannon-pinion 33 carries the minute display 32, and the hours wheel 35 carries the hours display 31, as shown in FIG. 1.

The cannon-pinion 33 and the centre pinion 21 are arranged concentrically to one another, which facilitates the assembly operations for the horological movement.

In a preferred example embodiment of the invention, the centre pinion 21 is mounted such that it pivots about a centre shaft 23 fixed to a structure of the horological movement.

The centre shaft 23 is further engaged through the cannon-pinion 33 and arranged such that said cannon-pinion 33 is free to rotate about said shaft.

Moreover, advantageously, the cannon-pinion 33 is configured to have axial mobility along the centre shaft 23 when the coupling device 40 is in the uncoupled state.

These degrees of freedom help increase mechanical play and thus reduce friction, in particular that generated when setting the hands on the hours 31 and minutes 32 displays.

Preferably, the axial motion is imperceptible to the naked eye.

When the coupling device 40 is in the uncoupled state, the cannon-pinion 33 is capable of resting against the centre wheel set, and in particular against the centre pinion 21, which thus constitutes a first axial stop for the cannon-pinion 33.

Advantageously, the centre shaft 23 includes, in the example embodiment shown in FIG. 1, a collar 24 intended to constitute a second axial stop for the cannon-pinion 33, opposite the first axial stop. More specifically, as shown in FIG. 1, the collar 24 can be arranged at one of the ends of the centre shaft 23 opening out beyond said cannon-pinion 33.

Via its other end, i.e. the end close to the centre pinion 21, the centre shaft 23 is fixed, for example by a tight fit, in a recess 25 made in the structure of the horological movement, as shown in FIG. 1.

In FIG. 1, the centre pinion 21 rests and bears against the structure of the horological movement; said structure being formed by a bridge 26 in this example embodiment of the invention. In other example embodiments not shown in the figures, the centre shaft 23 can be provided with a radial lip arranged to be interposed between said structure and the centre pinion 21 and to separate them from one another.

As shown in FIG. 1, the reset mechanism includes a hammer 14 adapted to cooperate with a heart cam 15 arranged such that it can rotate about the cannon-pinion 33 and fixed to the hours wheel 35. The hand-setting means 60, shown in part in FIG. 2, are adapted to drive the cannon-pinion 33, the motion-work 34 and the hours wheel 35 such that they rotate, according to a predetermined angular stroke. It should be noted that no example of a sympathique hand-setting method is described in the present text insofar as this method is not the subject matter of the present invention and is as such within the reach of a person skilled in the art.

In the preferred example embodiment of the invention, the coupling device 40 includes a disc 41 fixed to the cannon-pinion 33, a friction spring 42 carried by the centre wheel set, in particular by the centre pinion 21, and a movable flange 43 interposed between the disc 41 and the friction spring 42. Thus, the friction spring 42 applies a compressive force to the flange 43 tending to force a friction surface of said flange 43 into bearing against a friction surface of the disc 41.

In particular, the flange 43 includes an outer periphery opposite an inner periphery. The flange 43 has a bevel on its outer periphery and has, on its inner periphery, a shoulder forming a stop against which the friction spring 42 rests. Preferably, the flange 43 and the friction spring 42 are made integral only as regards rotation thanks to the friction torque resulting from the compressive force.

In order to allow for sliding between the going train 20 and the display train 30 when the coupling device 40 is in the coupled state, the disc 41 and the flange 43 are configured such that the friction torque generated by the bearing of the flange 43 against the disc 41 is sufficiently high to allow the centre pinion 21 to drive the cannon-pinion 33 in rotation, but sufficiently low for a user to be able, by operating the crown 13, to exceed this friction torque and thus drive the cannon-pinion 33 such that it rotates by means of the crown 13 operated hand-setting mechanism.

Preferably, the friction torque at the interface between the flange 43 and the disc 41 is substantially 80 g*mm, which can also be noted as 0.8 Nmm, when the coupling device 40 is in the coupled state.

It should be noted that for this purpose, the coupling device 40 is configured such that the friction torque resulting from the compressive force exerted by the friction spring 42 on the flange 43 is greater than the friction torque generated at the interface between the flange 43 and the disc 41.

In order to drive the coupling device 40 between the uncoupled state thereof and the coupled state thereof, and vice-versa, the latter includes two arms 44 forming a clamp arranged to cooperate with the flange 43. The coupled and uncoupled states are defined by the angular spacing of the arms 44 from one another, the arms being spaced apart to cause the coupling device 40 to couple and being moved towards one another to cause the coupling device 40 to uncouple.

The two arms 44 are forced into a position in which they are separated from one another by a spring 440, such that the coupling device 40 is in the coupled state by default. Moreover, the arms 44 are configured so as to be able to be forced into a position in which they are brought closer to one another, against the forces generated by the spring 440, upon the operation of the first sympathique actuator 11 of the watch 10, so as to drive the coupling device 40 into the uncoupled state.

Advantageously, as shown in FIG. 1, the arms 44 are arranged so as to cooperate with the outer periphery of the flange 43 when they are brought closer to one another, in order to oppose the compressive forces generated by the friction spring 42, and thus move said flange 43 away from the disc 41, and consequently drive the coupling device 40 into the uncoupled state.

More specifically, in the example embodiment shown in FIG. 2, the sympathique hand-setting mechanism includes a lever 70 arranged to receive loads from the first sympathique actuator 11 of the watch 10, and to transmit them to the arms 44 via a pin 71.

In particular, in the example embodiment shown in FIG. 2, the pin 71 is adapted to bear against one of the arms 44, which is itself kinematically connected to the other arm 44, so as to be able to bring said arms 44 closer to one another, and thus drive the coupling device 40 into the uncoupled state.

In other words, in the preferred example embodiment of the invention, the pin 71 bears against a sidewall of one of the arms 44 and is capable, when the lever 70 is moved, of causing said arm 44 to move against the force of the spring 440.

The arms 44 cooperate with one another at an interface area via which the arm 44 against which the pin 71 bears can force the other arm 44 to move against the force generated by the spring 440, and via which the arm 44 subjected to the force generated by the spring 440 transmits this force to the other arm 44.

It goes without saying that, in other example embodiments of the invention, the arms 44 can be individually subjected to the force of a spring which is specific thereto.

Moreover, the one or more springs can be formed by a resilient portion of one or of each arm 44.

In another example embodiment of the invention, the clamp is made in one piece, with the two arms 44 thus having resilient properties, at least at the interface area, such that they are capable of moving relative to one another.

Advantageously, the flange 43 is configured such that it bears against the structure of the horological movement via a bearing surface opposite the friction surface, when the coupling device 40 is in the uncoupled state.

Generally speaking, it should be noted that the implementations and embodiments considered hereinabove have been described by way of non-limiting examples, and that other alternative implementations and embodiments can thus be envisaged.

Figure 3:
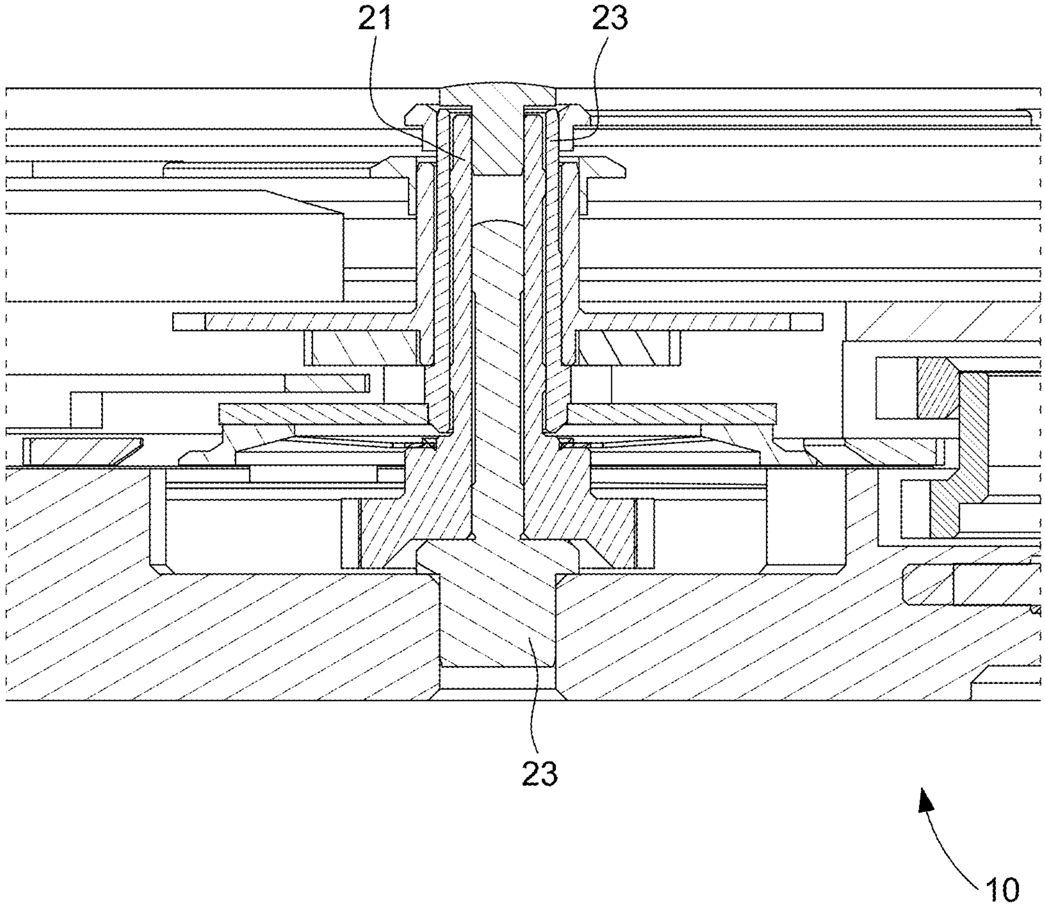
FIG. 3 diagrammatically shows the horological movement in FIG. 1 according to another example embodiment.

In particular, in another example embodiment of the invention, as shown in FIG. 3, the centre pinion 21 can include a tubular portion engaged in the cannon-pinion 33, said cannon-pinion 33 thus being arranged such that it can rotate about said tubular portion and being free to slide along same. Furthermore, the centre shaft 23 does not extend beyond the tubular portion of the centre pinion 21 and does include a collar. More specifically, the tubular portion receives, at the free end thereof, a peg comprising a collar intended to constitute an axial stop for the cannon-pinion 33. The peg is thus fixed to and engaged with the tubular portion of the centre pinion 21.

Furthermore, the present text has described a lever on which a pin is arranged for transmitting a load from the first sympathique actuator 11 of the watch 10; however, in other example embodiments, the hand-setting mechanism can include any other transmission element adapted to transmit a load received by said first sympathique actuator 11 of the watch 10.

The invention claimed is:

1. A sympathique watch (10) comprising:
a horological movement including:
a going train (20), a display train (30) connected to at least one display of a time value (31, 32), a sympathique hand-setting mechanism, and a crown (13) operated hand-setting mechanism, wherein the sympathique hand-setting mechanism includes:

a coupling device (40) interposed between said going train (20) and display train (30), said coupling device (40) being configured to adopt an uncoupled state in which the going train (20) is disengaged from the display train (30) so as to allow hands to be set on the display by means of the sympathique hand-setting mechanism, and to adopt a coupled state in which a kinematic link is established between said gear trains, said link allowing for sliding enabling the hands to be set on the display by means of the crown (13) operated hand-setting mechanism.

2. The watch (10) according to claim 1, wherein the going train (20) includes a centre wheel set, the display train (30) includes a cannon-pinion (33), and the coupling device (40) being configured such that when in the coupled state, it engages said centre wheel set and said cannon-pinion (33) such that they rotate as one.

3. The watch (10) according to claim 2, wherein the centre wheel set comprises a centre pinion (21) mounted such that it pivots about a centre shaft (23), and the cannon-pinion (33) being arranged about the centre shaft (23) via a sliding pivot link.

4. The watch (10) according to claim 3, wherein the horological movement includes a collar (24) intended to constitute an axial stop for the cannon-pinion (33).

5. The watch (10) according to claim 3, wherein the cannon-pinion (33) is arranged such that, when the coupling device (40) is in the uncoupled state, it has an axial motion and is capable of resting against the centre wheel set.

6. The watch (10) according to claim 5, wherein the coupling device (40) includes:

a disc (41) fixed to the cannon-pinion (33), a friction spring (42) carried by the centre wheel set, and a flange (43) interposed between the disc (41) and the friction spring (42) such that said friction spring (42) applies to said flange (43) a force that forces the flange (43) into bearing, via a friction surface, against the disc (41), and the flange (43) being configured such that it bears against a structure of the horological movement via a bearing surface opposite the friction surface, when the coupling device (40) is in the uncoupled state.

7. The watch (10) according to claim 2, wherein the coupling device (40) includes:

a disc (41) fixed to the cannon-pinion (33), a friction spring (42) carried by the centre wheel set, and a flange (43) interposed between the disc (41) and the friction spring (42) such that said friction spring (42) applies to said flange (43) a force that forces the flange (43) into bearing, via a friction surface, against the disc (41).

8. The watch (10) according to claim 7, wherein the disc (41) and the flange (43) are configured such that, when the coupling device (40) is in a coupled state, the friction torque generated at the interface between the friction surface of the flange (43) and said disc (41) is substantially 80 g*mm.

9. The watch (10) according to claim 8, wherein the coupling device (40) includes:

a clamp comprising two arms (44) capable of moving relative to one another and arranged on either side of the flange (43), and said arms (44) being adapted to cooperate with said flange (43) so as to cause the coupling device (40) to change state.

10. The watch (10) according to claim 9, wherein the flange (43) includes an inner periphery opposite an outer periphery, one being configured to cooperate with the friction spring (42) and the other configured to cooperate with the clamp.

11. The sympathique watch (10) according to claim 1, further comprising at least one of:

a first sympathique actuator (11) that is separate from the crown, is extended from an inside of the watch to an outside of the watch, and is configured to transmit first loads from the outside of the watch to the coupling device (40) which at the inside of the watch; and a second sympathique actuator (12) that is separate from the crown and the first sympathique actuator (11), is extended from the inside of the watch to the outside of the watch, and is configured to transmit second loads from the outside of the watch to the inside of the watch and control the hands to be set on the display based on the second loads.

12. The sympathique watch (10) according to claim 11, further comprising both of the first sympathique actuator (11) and the second sympathique actuator (12).

* * * * *